UNITED STATES PATENT OFFICE.

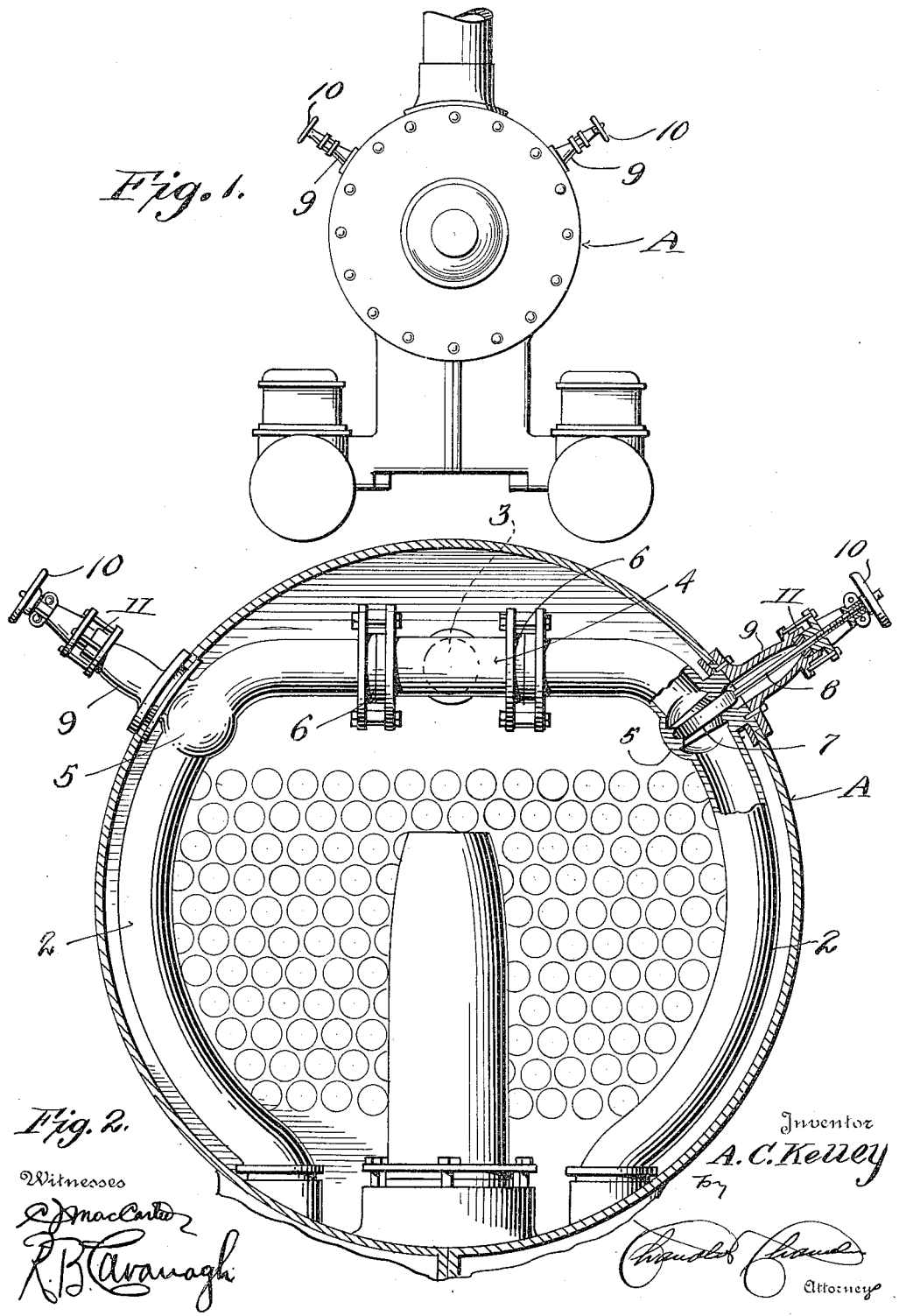

ALBERT C. KELLEY, OF GRADYVILLE, GEORGIA.

VALVE CONNECTION.

1,151,017.  Specification of Letters Patent.  Patented Aug. 24, 1915.

Application filed December 1, 1913. Serial No. 803,998.

*To all whom it may concern:*

Be it known that I, ALBERT C. KELLEY, a citizen or the United States, residing at Gradyville, in the county of Grady, State of Georgia, have invented certain new and useful Improvements in Valve Connections; and I do hereby declare the following to be a full, clear, and exact description of the invention, such as will enable others skilled in the art to which it appertains to make and use the same.

The present invention relates to certain novel and useful improvements in a valve fitting adapted to be attached to the steam pipes leading to the steam chests of locomotive engines.

In the present instance it is my purpose to form the steam pipes leading to the valve chests of the locomotive with valve casings, in which casings are arranged reciprocating gate valves, accessible from the outside of the locomotive, the construction being such that the valve of each pipe may be readily and instantly operated to cut off the flow of steam through such pipe, should any accident temporarily disable the steam chest or cylinder to which such pipe is connected. By such an arrangement such disabled steam chest or cylinder may be quickly cut out of operation, and the locomotive worked from the opposite chest or cylinder, so that the engine may proceed with one cylinder without the usual loss of time incident to putting the engine on one side.

Still a further object of my invention is to construct each branch steam pipe of the locomotive with an enlarged portion which is integral with the pipe and which forms the lower or seat section of a valve casing. By such a construction the use of unnecessary packings, joints and the like is avoided and the leakage usually incident to such packings and joints is thus obviated.

It is also my purpose to provide a valve attachment for the branch steam pipes leading to the cylinders of the locomotive which will embody the desired features of simplicity, efficiency, economy and reliability.

With the above recited objects and others of a similar nature in view, my invention consists in the construction, combination and arrangement of parts set forth in and falling within the scope of the appended claim.

In the accompanying drawings: Figure 1 is a view in front elevation of a portion of a locomotive and showing my invention as applied thereto. Fig. 2 is a vertical sectional view taken through a portion of the locomotive boiler, one of the branch steam pipes and the valves therefor, the parts being shown on an enlarged scale relative to Fig. 1.

Referring now to the accompanying drawings in detail, the letter A indicates in conventional form a portion of a locomotive in the smoke box of which are located the usual branch steam pipes 2—2 leading to the cylinders or steam chests of the locomotive.

The numeral 3 indicates the usual dry steam pipe of the locomotive and 4 is the T-connection therefor, this connection being of a common form which usually connects the branch steam pipes with the steam pipe 3. Each of the branch pipes 2 has cast or otherwise formed integral therewith at one end thereof, a valve casing 5. In the present instance I have shown each pipe provided with a valve at the top end thereof, although it will be understood that the valve may be located anywhere along the length of branch pipe. Each valve casing 5 may be connected at its free end with the adjacent arm of the T-connection by means of the flexible joints 6, of any suitable form. Within the valve casing is arranged a reciprocating gate valve 7 operated by the stem 8, which extends through the bonnet 9 of the valve. As will be seen by reference to Fig. 2 this bonnet is elongated in form and projects through the wall of the smoke box to the outside of the locomotive, so that the hand wheel 10 which operates the stem and consequently the gate valve itself, is readily accessible to the engineer or other operator standing outside the locomotive, and it will be further noted that the usual stuffing box or boxings for the valve is located at the outside of the locomotive, or at the upper end of the bonnet as shown at 11.

From the above description, taken in connection with the accompanying drawings, the construction and operation of my invention will be readily apparent to those skilled in the art. Should the steam cylinder at one side of the locomotive, for any reason be disabled, the gate valve of the branch pipe 2 leading to such cylinder may be operated to close such branch pipe and consequently shut off the flow of steam through such pipe, and the steam from the pipe 3 will then pass through the other branch steam pipe 2 to the intact cylinder at the opposite side of the locomotive, and the latter may thus be operated upon such single cylinder. It will thus be seen that by the use of my invention either of the branch steam pipes may be cut off at will, so that the work will be instantly shifted to one of the cylinders, and at the same time the valve is readily accessible from the outside of the locomotive, so that no delay is incident to the operating of the same. Furthermore, the liability of leaky joints, packings and the like is avoided.

What I claim is:

The combination of a pipe having an enlarged section forming the seat portion of a valve casing, a shell spaced apart from said pipe and having an opening therethrough in alinement with the enlarged section of the pipe, a valve bonnet arranged on the outside of the shell and communicating through the opening therein with the seat portion of the valve casing, a valve located within the casing and adapted to be moved transversely of the pipe to open and close the passage through the pipe, and a valve stem projecting through the opening in the shell and through the bonnet, said stem being operable to actuate the valve.

In testimony whereof, I affix my signature, in the presence of two witnesses.

ALBERT C. KELLEY.

Witnesses:
H. H. BOYD,
W. H. BRYAN.

Copies of this patent may be obtained for five cents each, by addressing the "Commissioner of Patents, Washington, D. C."